(12) United States Patent
Hamm et al.

(10) Patent No.: US 8,593,002 B2
(45) Date of Patent: Nov. 26, 2013

(54) PORTABLE INTEGRATED POWER SUPPLY AND HVAC UNIT

(75) Inventors: Keith Hamm, Oshkosh, WI (US); Chad Konop, Oshkosh, WI (US); James L. Roberts, Green Lake, WI (US)

(73) Assignee: Magnum Power Products, LLC, Waukesha, WI (US)

( * ) Notice: Subject to any disclaimer, the term of this patent is extended or adjusted under 35 U.S.C. 154(b) by 288 days.

(21) Appl. No.: 12/892,701

(22) Filed: Sep. 28, 2010

(65) Prior Publication Data

US 2011/0187123 A1    Aug. 4, 2011

Related U.S. Application Data (60) Provisional application No. 61/246,168, filed on Sep. 28, 2009.

(51) Int. Cl.
*F02B 63/04* (2006.01)
*H02K 7/18* (2006.01)

(52) U.S. Cl.
USPC .......................................................... 290/1 A

(58) Field of Classification Search
USPC ............ 290/1 A, 22; 165/104.34, 104.14, 61; 62/323.1, 323.4; 417/364, 375, 410; 220/86.1
See application file for complete search history.

(56) References Cited

U.S. PATENT DOCUMENTS 7,642,665 B2 *    1/2010    Konop et al. ................. 290/1 A
2008/0042625 A1 *    2/2008    Konop et al. ..................... 322/1

FOREIGN PATENT DOCUMENTS

WO    2008/024686    *    2/2008

OTHER PUBLICATIONS

Product Flyer for ULTRA-Lite Environmental Control Units, Air Rover Inc.
Product Photograph of BASE X Portable Trailer.
Product Specifications for BASE-X Shelter Support Trailer, Bea Maurer Inc., 2006.
DRASH Catalog, DHS Systems International.
GET Shelter Support System Brochure, General Dynamics C4 Systems.

* cited by examiner

*Primary Examiner* — Javaid Nasri
(74) *Attorney, Agent, or Firm* — Brian G. Gilpin; Godfrey & Kahn, S.C.

(57) ABSTRACT

An integrated portable power unit including a power pack and a generator mounted within a first compartment and including a second isolated air handling compartment. The air handling compartment may include a fan for moving air through ductwork, a radiator for receiving heated cooling water from the power pack and a heat exchanger connected to a compressor for generating cooled water, the compressor and the fan connected to the power pack.

17 Claims, 9 Drawing Sheets

PORTABLE INTEGRATED POWER SUPPLY AND HVAC UNIT

CROSS-REFERENCE TO RELATED APPLICATION

The present application claims priority to earlier filed Provisional Application Ser. No. 61/246,168, filed on Sep. 28, 2009, the disclosure of which is incorporated herein by reference in its entirety.

BACKGROUND

In emergency response situations and military deployments, it is desirable to have a portable power supplies as well as air conditioning equipment. In emergency response situations requiring a mobilization of resources, often the local electrical power infrastructure will be damaged or completely knocked out. Existing power supplies may be too unreliable to serve a command post or a medical facility. Clean and reliable power supply is desirable and a variety of conventional options for such power supplies are known.

Further, it is often desirable to have the ability to provide environmental controls for military facilities and emergency response teams. For example, a military command post set up in a tent or other shelter in a desert environment may desirably have access to air conditioning to control the personnel and equipment operating environment. An emergency response command post set up in a flood ravaged area may need to have a reliable source of heat. Again, portable units to provide heat and air conditioning are known.

Improvements to these conventional approaches to environmental controls and power supply are desirable.

DETAILED DESCRIPTION

Referring now to the FIGS. 1 to 8, an integrated power and HVAC unit 100 may be mounted on a standard military trailer 102 for easy portability by a conventional road or off-road surface transport. Unit 100 may also be separated from trailer 102 to permit transportation by aircraft or other mode of transportation to be placed on a trailer where conventional road or off-road surface transport is needed.

Unit 100 is configured to provide electrical power through a standard electrical connection interface 104 mounted on an exterior of the unit and also to provide air handling equipment driven by a common power pack within the unit. As shown in FIGS. 1 to 8, unit 100 includes a power pack in the form of an internal combustion engine 106 mounted within a first side or compartment 108 of the unit and air handling equipment mounted within a separate second side or compartment 110 of unit 100. An electrical generator 112 is mounted within the first compartment 108 and driven directly by a shaft 107 of engine 106. Separation of the power and air handling compartments is desirable to provide clean, odor free air through the air handling equipment. It is also desirable to separate the heat and noise of the engine as much as possible from the air handling side. Additional features of the air handling side will be discussed below.

Generator 112 is connected to voltage and current conditioning equipment that take the raw electrical power from the generator and provide electrical power at a desired voltage, current and frequency to power connections 104. It is anticipated that unit 100 may be adapted to operate at a constant engine speed or that the speed of engine 106 may varied to adapt to the load demand placed on the engine.

Figure 9:
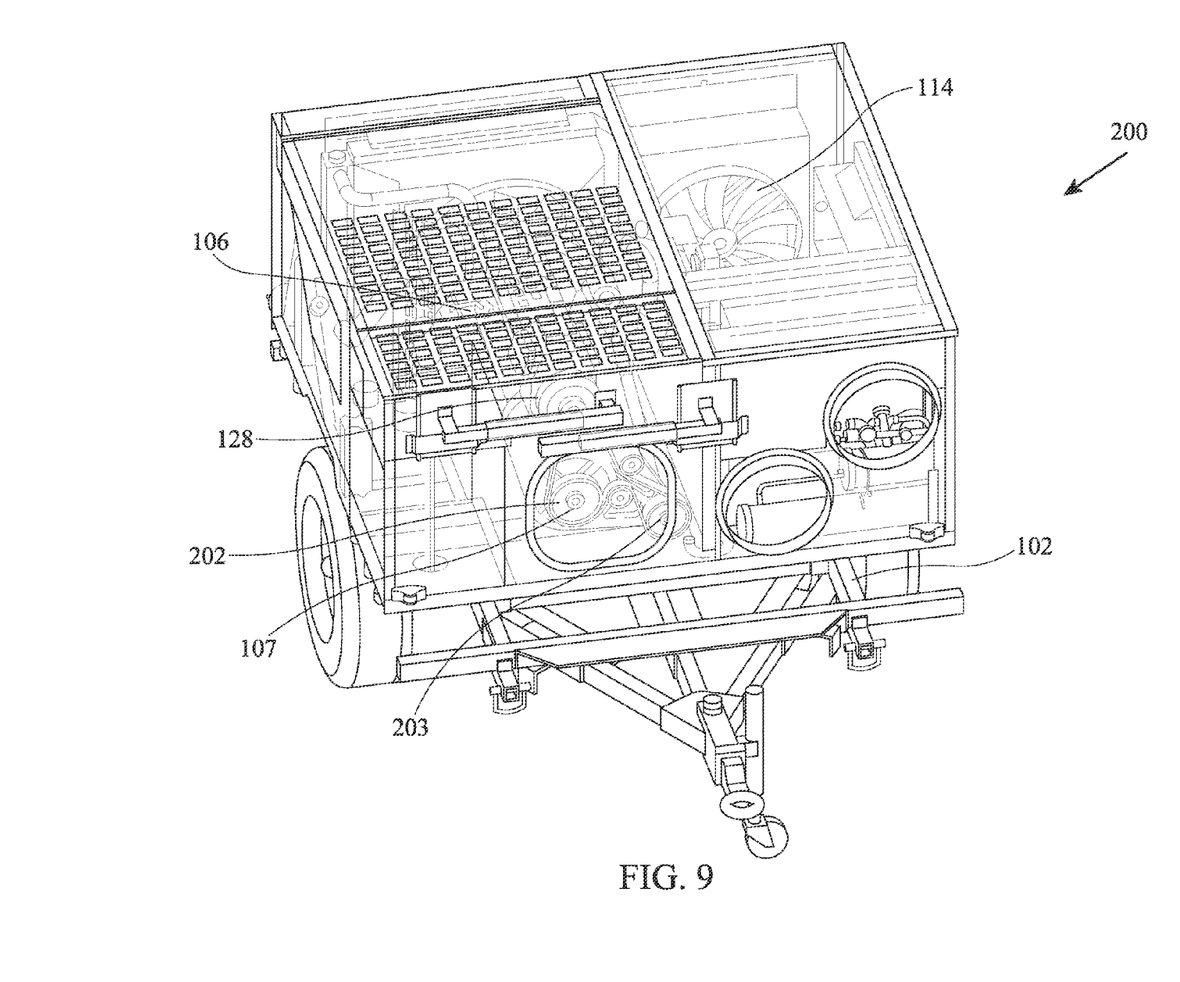
FIG. 9 is a front perspective view of a second embodiment of an integrated power supply and HVAC unit according to the present disclosure with some of the side panels shown transparent to provide visibility of interior components.

Unit 100 as shown includes a hydraulic pump 105 driven by engine 106 that provides power to operate the air handling fan 114 mounted at a rear of air handling compartment 110. FIG. 9 illustrates a second embodiment of an integrated power and HVAC unit 200 with a shaft drive arrangement 202 connecting a shaft 107 of an engine 106 to both a compressor 128 and a drive shaft 203 for directing power to drive fan 114. Unit 200 is otherwise similarly configured to unit 100 in most aspects. Both units are representative of the general inventive concept of the present disclosure and are not intended to limit the scope of the present disclosure.

It is also anticipated that fan 114 may be driven by an electrical motor that draws power from the unit. Regardless of the type of drive provided for fan 114, it may be necessary to ensure that the drive can be transmitted through a central bulkhead 146 separating the two compartments. As will be discussed below, it is desirable that the compartment be kept separate from each other and the drive arrangement will be preferably configured without providing any path for air bleed between the compartments.

It is anticipated that there are benefits and drawbacks to each arrangement of fan drive and the particular operating requirements for the unit may determine the fan best suited for a unit according to the present disclosure. Some drive approaches may be better suited for constant speed engines, while others may work better with variable engine speeds. Some approaches to fan drive are mechanically simpler and easier to maintain. Alternatively, electrical controls integrated into units according to the present disclosure may be used to alleviate some of the drawbacks of the various methods of driving fan 114.

At a rear of compartment 108 is a louvered opening 116 where air may exit unit 100. A plurality of openings 115 along an upper wall of compartment 108 allows air to enter the compartment to feed the engine and provide cooling air to be driven through the radiator. A portion of this upper wall may be formed by a removable or opening panel 109. A radiator 118 may be mounted adjacent opening 116 at the rear of compartment 108 with a fan 120 mounted adjacent an inner side of the radiator. Fan 120 may be electrically or crankshaft driven. Louvers or other forms or styles of baffles may be included for either or both openings 115 and opening 116 to provide for attenuation of the noise of the engine during operation.

Unit 100 may include a controller which directs the flow of cooling water from engine 106 through a proportioning valve 122 to either radiator 118 or a second radiator 119 mounted within air handling compartment 110. In this way, heat from engine 106 may be used to provide heat for air being supplied by unit 100 when heated air is requested. When more heat is requested from unit 100 than can be provided through the use of waste heat from engine 100, an additional heating element 126, such as but not limited to an electrical resistance heating element, may be provided to add more heat to the water.

When cooled air is requested from unit 100, the waste heat from the engine can be directed to radiator 118 and exhausted from unit 100. To provide cooled air, a compressor 128 may be mounted within compartment 108 and driven by engine 106 through a clutch belt drive 130. This permits compressor 128 to be driven when cold air is requested or to stand idle when such cooling is not needed, reducing wear on components and drag on the engine.

A heat exchanger 132 may be mounted adjacent a front end of compartment 110 permits chilled refrigerants to be brought into contact with air flowing through the air handler before exiting the compartment through outlets 134. An air inlet 136 is provided at an opposite end of compartment 110 and allows air to be draw into the compartment by fan 114. Fan 114 is positioned adjacent the inlet so that a positive pressure condition exists within compartment 110 when the fan is operational and air is being supplied by unit 100. Positive pressure within the compartment helps prevent fumes or contaminants from the adjacent compartment or from outside the unit from entering the stream of air provide by the unit. Inlet 136 is configured to permit attachment of an air return duct venting the space being provided with air through outlets 134. An air filter 124 may be placed adjacent fan 114 to filter incoming air. Alternatively or additionally, a second air filter 125 may be placed adjacent heat exchanger 132 and radiator 119 to filter outgoing air.

As shown in the FIGS., a unit controller 140 may be mounted to a side of air handling compartment 110. This positioning may be desirable to separate the controls from heat generated by the engine, generator and/or compressor. Such placement may also be advantageous to permit more efficient use of the space within mechanical compartment 108. Power connections 104 may also be mounted in the side adjacent unit controller 140. Controller 140 may include a removable control head 148 that may be tethered to the controller but placed within the space being heated or cooled. Such a control head may permit operation of the unit from within the space and may further include a thermostat or other automated or emergency control functions.

Adjacent compressor 128 and generator 112 within compartment 108 may be positioned fuel tank 142 for engine 106. An exterior fuel filler 144 access may provided on the side opposite from controller 140 and power connections 104 for safety purposes and to permit refueling during operation of the unit. A variety of power plants may be used for unit 100 and may include diesel engines, gasoline engines and alternative fuel engines. The nature of the engine will determine the particular arrangement of fuel filters, heaters, pumps or other fuel system elements that need to be incorporated with fuel tank 142 and between tank 142 and engine 106.

It is anticipated that generator 112 may be decoupled from engine 106 and used as a motor to drive compressor 128 and fan 114 when an external source of electrical power is available. Heating element 126 may be an electrically driven element that may also be connected to the external source of electrical power to generate heat within the cooling water within second radiator 119 when engine 106 is not operating. Such an arrangement may be useful to save fuel and reduce emissions by not needing to operate engine 106 when only heating and/or cooling of air are needed and an external source of electrical power is available. It might also save wear on engine 106 and permit repair of engine 106 while still having an operational HVAC function in unit 100.

It is further anticipated that arrangements may be provided to have any return duct connected inlet 136 to be under positive pressure. The arrangement of fan 114 described above, in the absence of any other air pressure sources for the return duct, would place the duct into a negative pressure condition. In such condition, any breach of the duct would permit potential contaminated air to be drawn into the duct and pushed through air handling compartment 110 and out outlets 134. Fans may be provided within the return duct to create a positive pressure condition within the duct. Alternatively, a coaxial return duct could be used with an outer air passage about an inner air passage. The outer passage would be positively pressured while fan 114 would draw air through the inner passage in the negative pressure condition described above. The outer passage would provide a protective shield about the inner passage and any breach of the outer passage would not permit potentially contaminated air into the inner duct. A breach of the inner duct would only permit the positively pressurized air within the outer duct to leak into the inner duct and would not permit potentially contaminated air into the inner duct unless both ducts were damaged.

Figure 1:
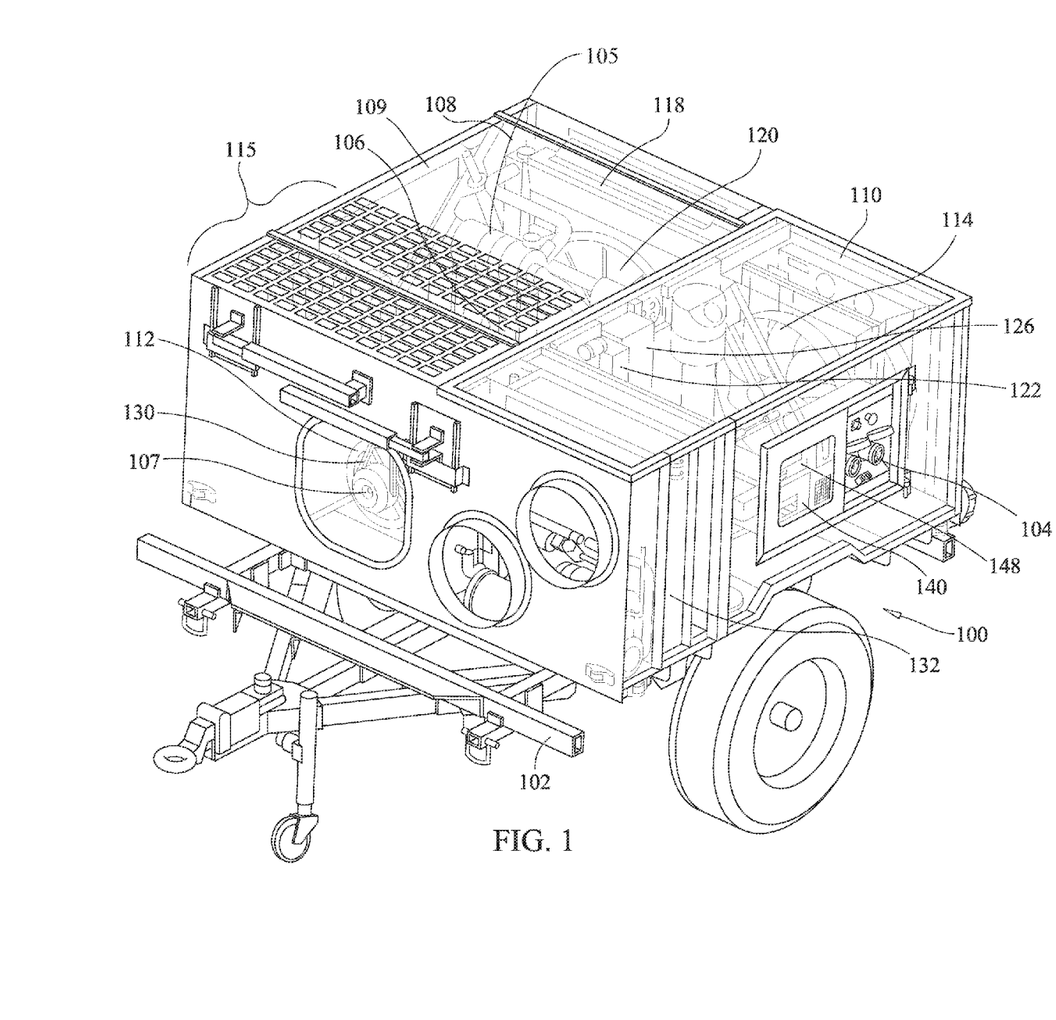
FIG. 1 is a front perspective view of a first embodiment of an integrated power supply and HVAC unit according to the present disclosure with some of the side panels shown transparent to provide visibility of interior components.
Figure 2:
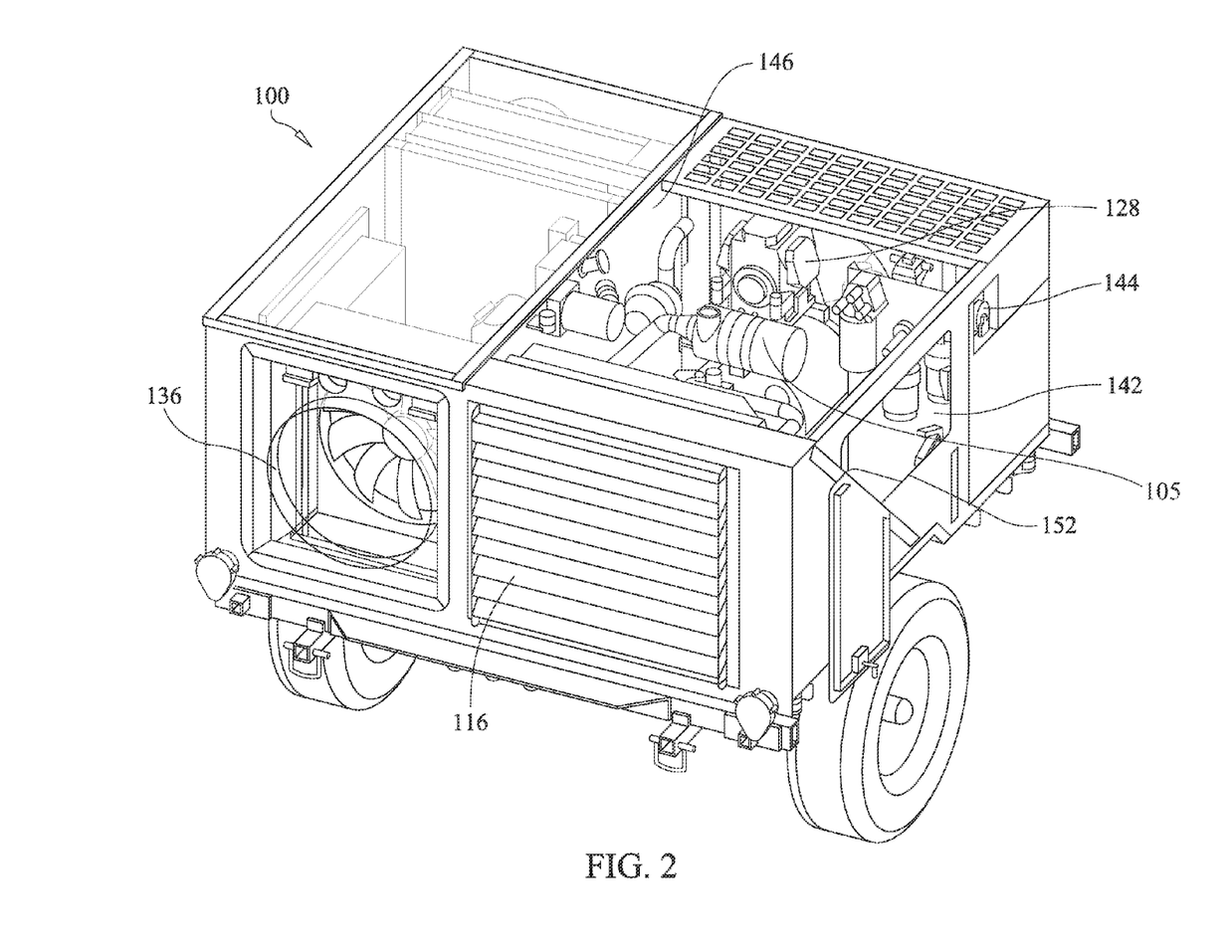
FIG. 2 is a rear perspective view of the unit of FIG. 1 with a top access cover over an engine and generator compartment removed.
Figure 3:
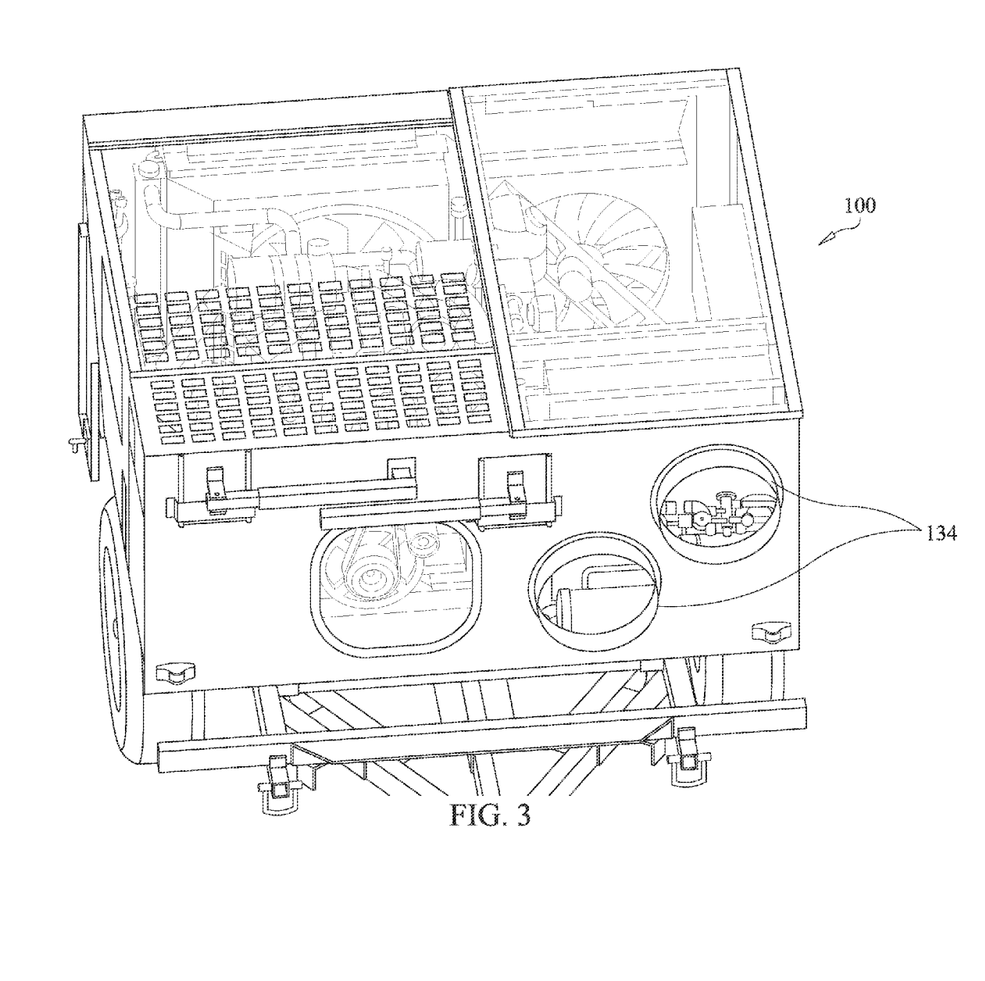
FIG. 3 is a top front perspective view of the unit of FIG. 1.
Figure 4:
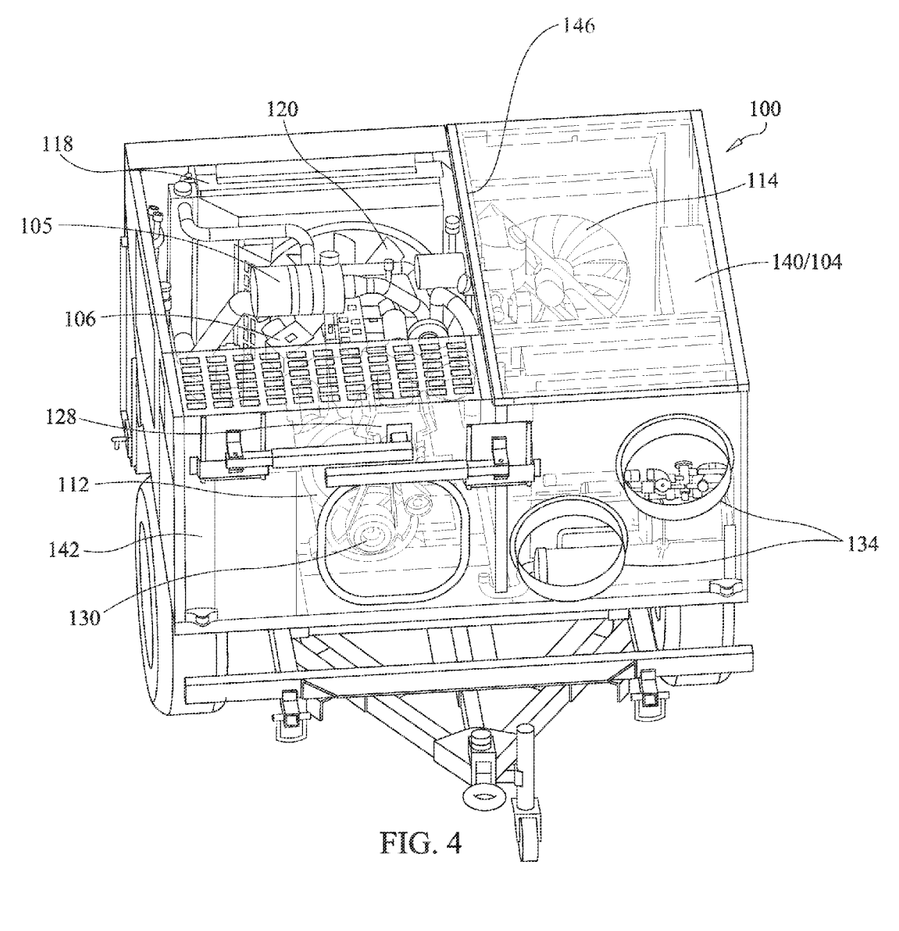
FIG. 4 is a top front perspective view of the unit of FIG. 2.
Figure 5:
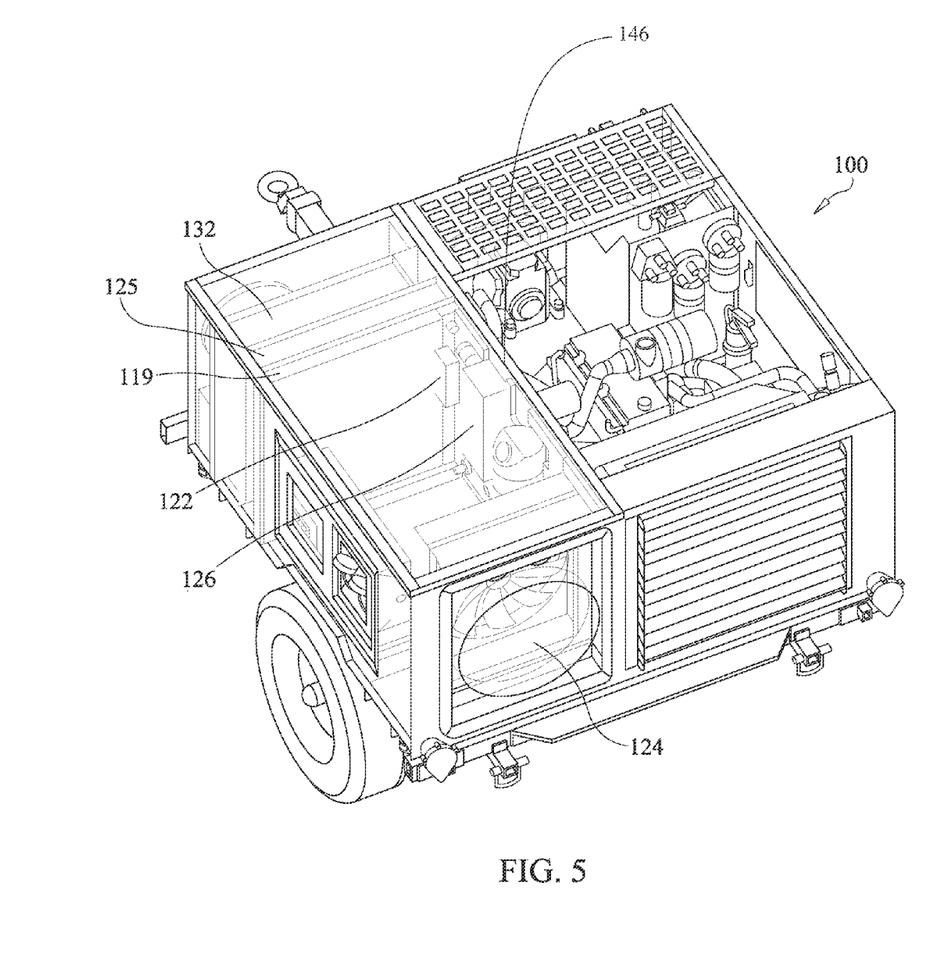
FIG. 5 is a top rear perspective view of the unit of FIG. 4.
Figure 6:
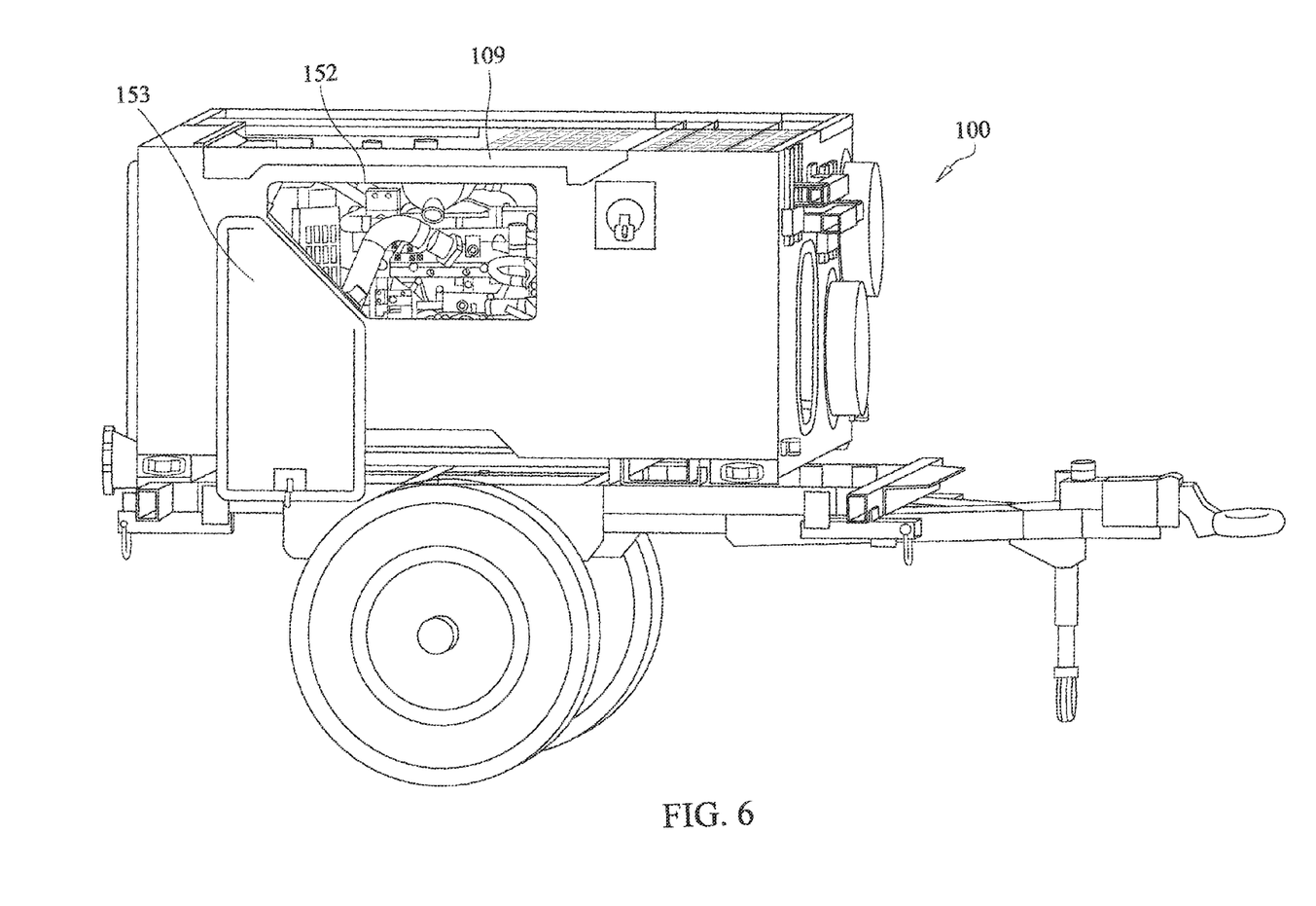
FIG. 6 is a first perspective side view of the unit of FIG. 1 without transparent panels and with a side access panel opened.
Figure 7:
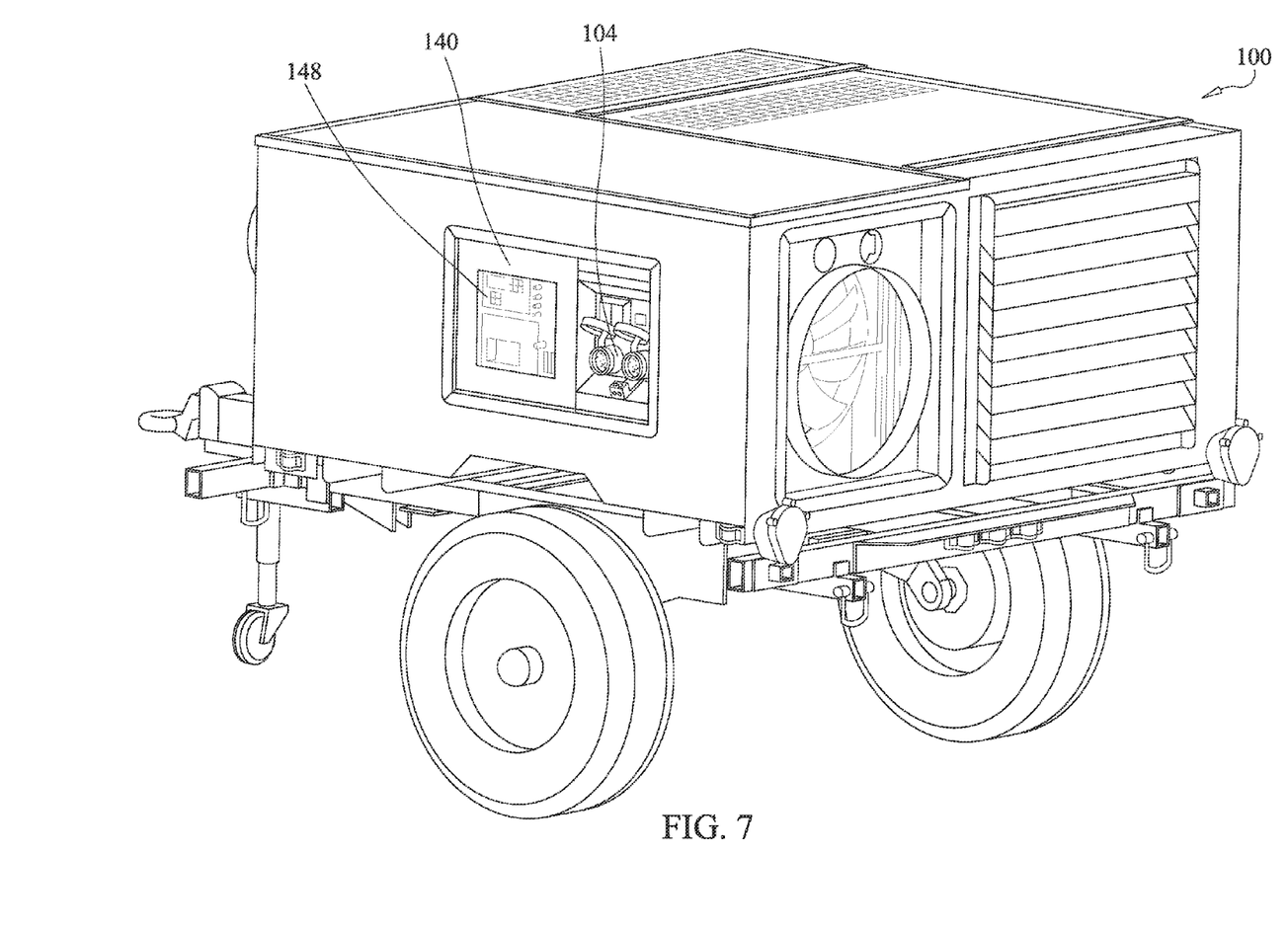
FIG. 7 is a second perspective side view of the unit of FIG. 1 without transparent panels.
Figure 8:
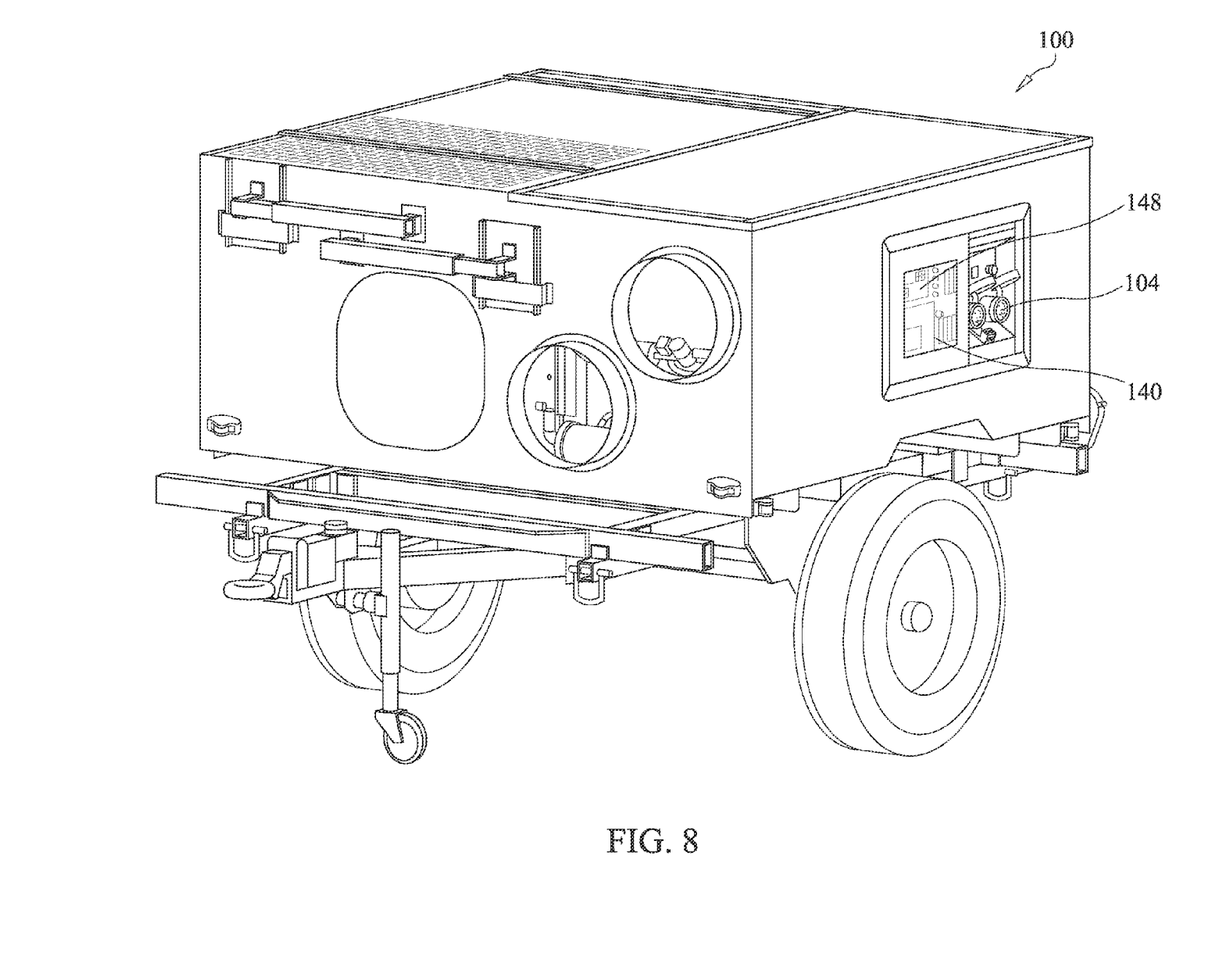
FIG. 8 is a front perspective view of the unit of FIG. 1 without transparent panels.

As is conventional for portable power units with internal combustion power packs, a variety of points of access to the engine are provided. A top opening 150 selectively covered by panel 109 is shown in FIGS. 2, 4 and 5 provides access to engine 106 for larger maintenance tasks and will permit removal of the engine and attached mechanical components if needed. A side panel opening 152 with a removable cover 153 as shown in FIG. 6 allows access to the engine for routine maintenance and operational checks.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. A portable integrated power unit comprising:
    a first compartment and a second compartment, the first and second compartments isolated from each other to prevent air from one compartment entering the other compartment;
    an electrical generator and a plurality of electrical power outlets providing electrical power therefrom, the electrical generator mounted within the first compartment:
    an engine mounted within the first compartment and configured to drive the electrical generator, the engine having first air inlet and an exhaust;
    an air hander mounted within the second compartment, the air handler including ductwork and a fan mounted within the ductwork for directing air from second air inlet through the ductwork and through an outlet, the fan configured to be driven by the engine.

2. The portable integrated power unit of claim 1, further comprising the fan within the ductwork of the air hander mounted adjacent the air inlet of the ductwork and configured to create a positive pressure relative to atmospheric pressure within the ductwork when the fan is operating.

3. The portable integrated power unit of claim 1, wherein the engine is connected to the electrical generator by a shaft.

4. The portable integrated power unit of claim 1, wherein the fan of the air hander is driven by the engine by a belt drive.

5. The portable integrated power unit of claim 1, wherein the fan of the air handler is driven by a hydraulic pump driven by the engine.

6. The portable integrated power unit of claim 1, wherein the fan of the air handler is driven by electrical power generated by the generator.

7. The portable integrated power unit of claim 1, the ductwork further comprising a first radiator within the ductwork configured so that the fan will direct from the inlet over the radiator toward the outlet, with the first radiator connected to the engine to receive a flow of cooling water for the engine.

8. The portable integrated power unit of claim 7, wherein a second radiator is mounted within the first compartment, the unit further comprising a proportioning valve to direct and control the flow of cooling water from the engine between the first and second radiators.

9. The portable integrated power unit of claim 8, further comprising a heating element connected to the first radiator to provide additional heat to the cooling water being directed toward the first radiator.

10. The portable integrated power unit of claim 1, further comprising a compressor driven by the engine, the compressor configured to chill refrigerants, the compressor connected to a heat exchanger adjacent the outlet so that air being pushed by the fan through the ductwork will pass through the heat exchanger to be cooled before exiting the second compartment.

11. The integrated power unit of claim 10, further comprising the compressor driven by the engine through a belt drive with a clutch, permitting selective operation of the compressor when the engine is operating.

12. The integrated power unit of claim 1, further comprising a unit controller mounted to a side of the second compartment opposite the first compartment.

13. The integrated power unit of claim 12, further comprising the unit controller being removably mounted to the side of the second compartment so that the unit controller may be remotely mounted.

14. The integrated power unit of claim 1, further comprising a fuel tank for the engine mounted within the first compartment and a fuel fill for the fuel tank mounted on a side of the first compartment opposite the electrical power outlets, the outlets being mounted on a side of the second compartment opposite the first compartment.

15. The integrated power unit of claim 1, further comprising a compressor and a heating element, the compressor and the heating element both connected to the ductwork to aide in the cooling and heating, respectively, of air being passed through the ductwork.

16. The integrated power unit of claim 15, further comprising the generator configured to be decoupled from the engine and operated as an electrical motor to drive the compressor when a source of external electrical power is coupled to the unit, and wherein the heating element is an electrical resistance element that can be energized by the external electrical power so that the integrated power unit may provide HVAC functions without requiring the operation of the engine.

17. The integrated power unit of claim 1, wherein the power unit is configured to be removably mounted to a wheeled trailer.

* * * * *

UNITED STATES PATENT AND TRADEMARK OFFICE
CERTIFICATE OF CORRECTION

PATENT NO. : 8,593,002 B2
APPLICATION NO. : 12/892701
DATED : November 26, 2013
INVENTOR(S) : Keith Hamm et al.

Page 1 of 1

It is certified that error appears in the above-identified patent and that said Letters Patent is hereby corrected as shown below:

In the Claims

Column 4-
Line 61, the word --handler-- should replace the word "hander"

Column 4-
Line 67, the word --handler-- should replace the word "hander"

Column 5-
Line 7, the word --handler-- should replace the word "hander"

Signed and Sealed this
Eighth Day of April, 2014

Michelle K. Lee
*Deputy Director of the United States Patent and Trademark Office*